United States Patent [19]

Prasad

[11] 3,986,406

[45] Oct. 19, 1976

[54] VARIABLE SPEED DRIVE CLUTCH

[75] Inventor: Keni K. Prasad, Thief River Falls, Minn.

[73] Assignee: Arctic Enterprises, Inc., Thief River Falls, Minn.

[22] Filed: Dec. 12, 1975

[21] Appl. No.: 640,345

Related U.S. Application Data

[63] Continuation of Ser. No. 457,482, April 3, 1974, abandoned.

[52] U.S. Cl. .......................................... 74/230.17 E
[51] Int. Cl.² ......................................... F16H 55/52
[58] Field of Search ............ 74/230.17 E, 230.17 C, 74/230.17 D, 230.17 B, 230.17 M; 192/105 C, 105 B, 103 A, 105 CP

[56] References Cited

UNITED STATES PATENTS

| | | | |
|---|---|---|---|
| 3,017,783 | 1/1962 | Brugghen et al. ............. | 74/230.17 E |
| 3,605,511 | 9/1971 | Deschene ..................... | 74/230.17 E |
| 3,608,387 | 9/1971 | Fox ............................... | 74/230.17 E |
| 3,727,478 | 4/1973 | Erickson et al. .............. | 74/230.17 E |
| 3,777,584 | 12/1973 | Domaas......................... | 74/230.17 E |
| 3,808,900 | 5/1974 | Vadeboncoeur et al. ..... | 74/230.17 E |

Primary Examiner—Samuel Scott
Assistant Examiner—Allan Russell Burke
Attorney, Agent, or Firm—Allegretti, Newitt, Witcoff & McAndrews

[57] ABSTRACT

A variable speed drive clutch of the type including a drive shaft, a driven or output shaft, a drive sheave on the drive shaft, a driven sheave on the driven shaft, and a drive belt for drivably interconnecting the drive sheave to the driven sheave. The drive sheave includes a fixed half and an axially slideable half. The slideable half defines a housing in which a support or spider for supporting flyweights is mounted. The flyweights move radially outward and inwardly, from a given radius at any given instant, in response to increasing and decreasing rotating speeds, respectively, of the drive shaft. Cam rollers associated with the flyweights ride on cam surfaces on the slideable sheave half and cause the slideable sheave half to move axially away from the fixed sheave half, when the flyweights move radially inwardly, and towards the fixed sheave half when the flyweights move radially outwardly.

The invention includes a non-circular, outer periphery for the drive shaft and bearing members are secured to the said housing and have the same inner peripheral shape as the outer periphery of the drive shaft so that rotation of the drive shaft is imparted directly to the slideable sheave half while, at the same time, the movable sheave half slides along the drive shaft in response to varying speeds of the drive shaft.

7 Claims, 7 Drawing Figures

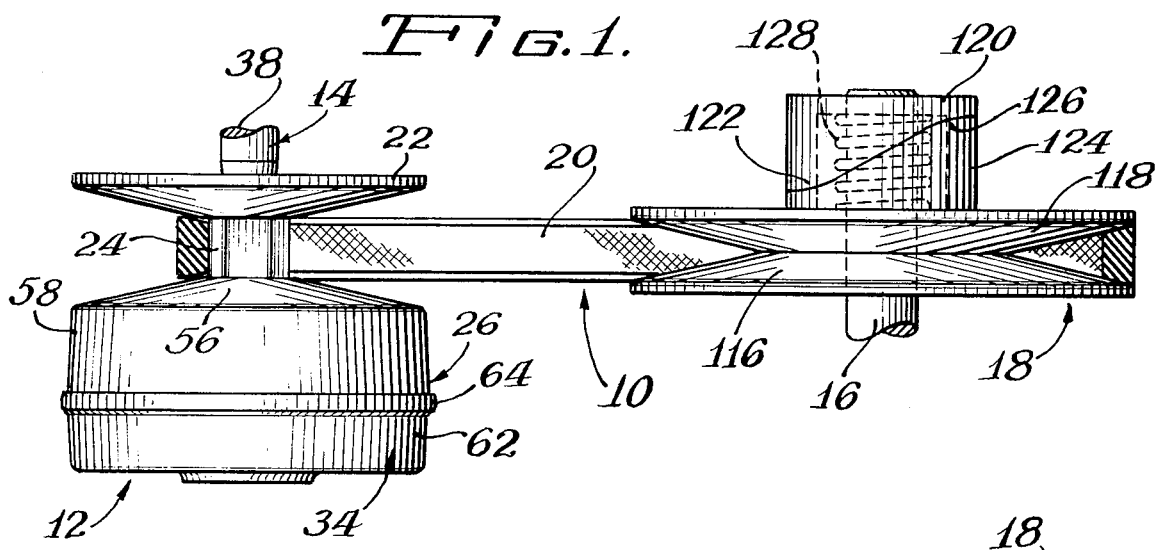
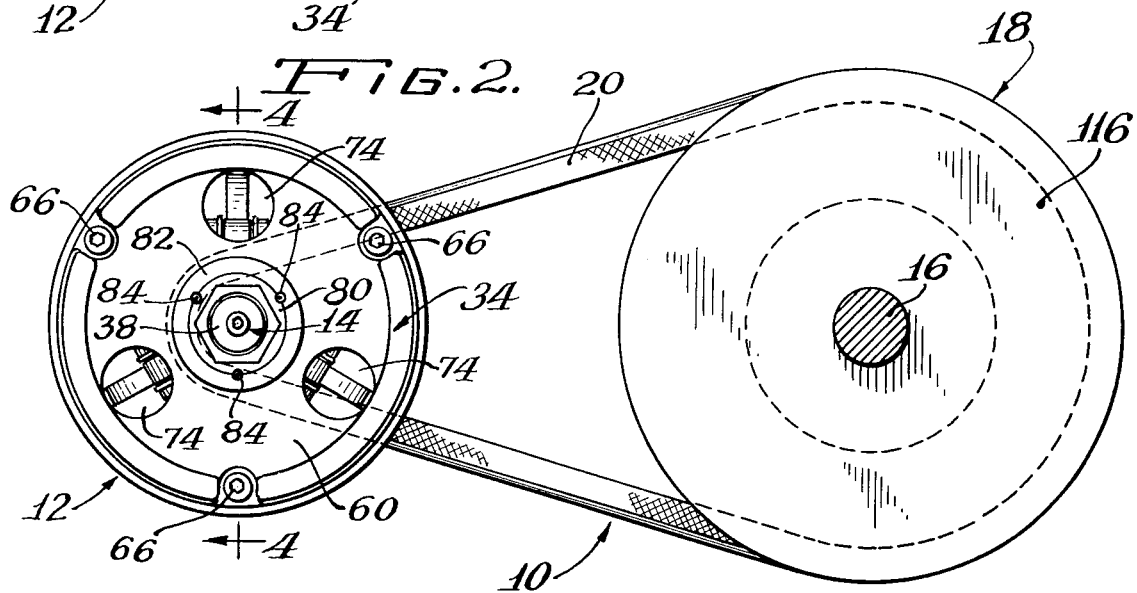
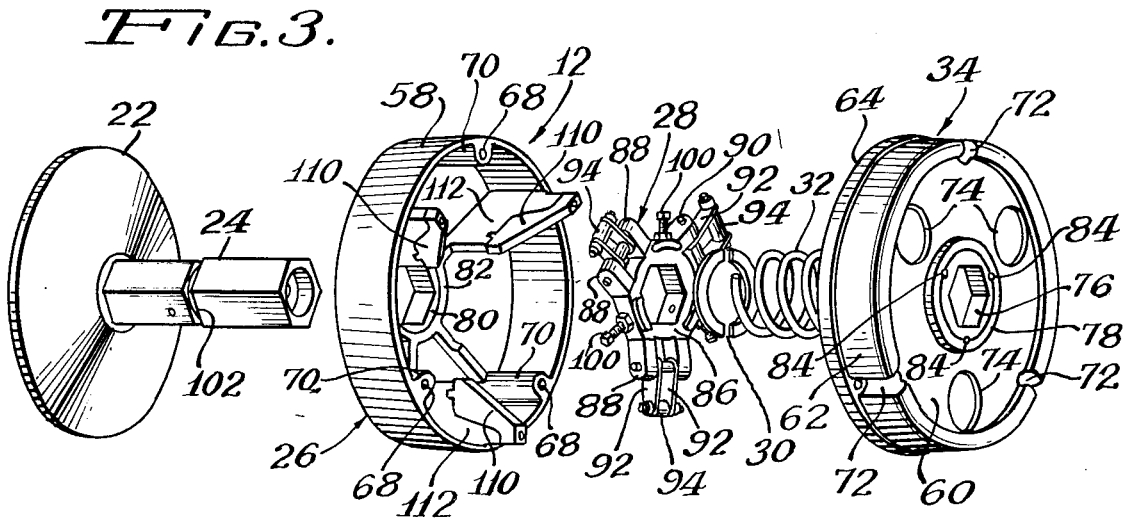

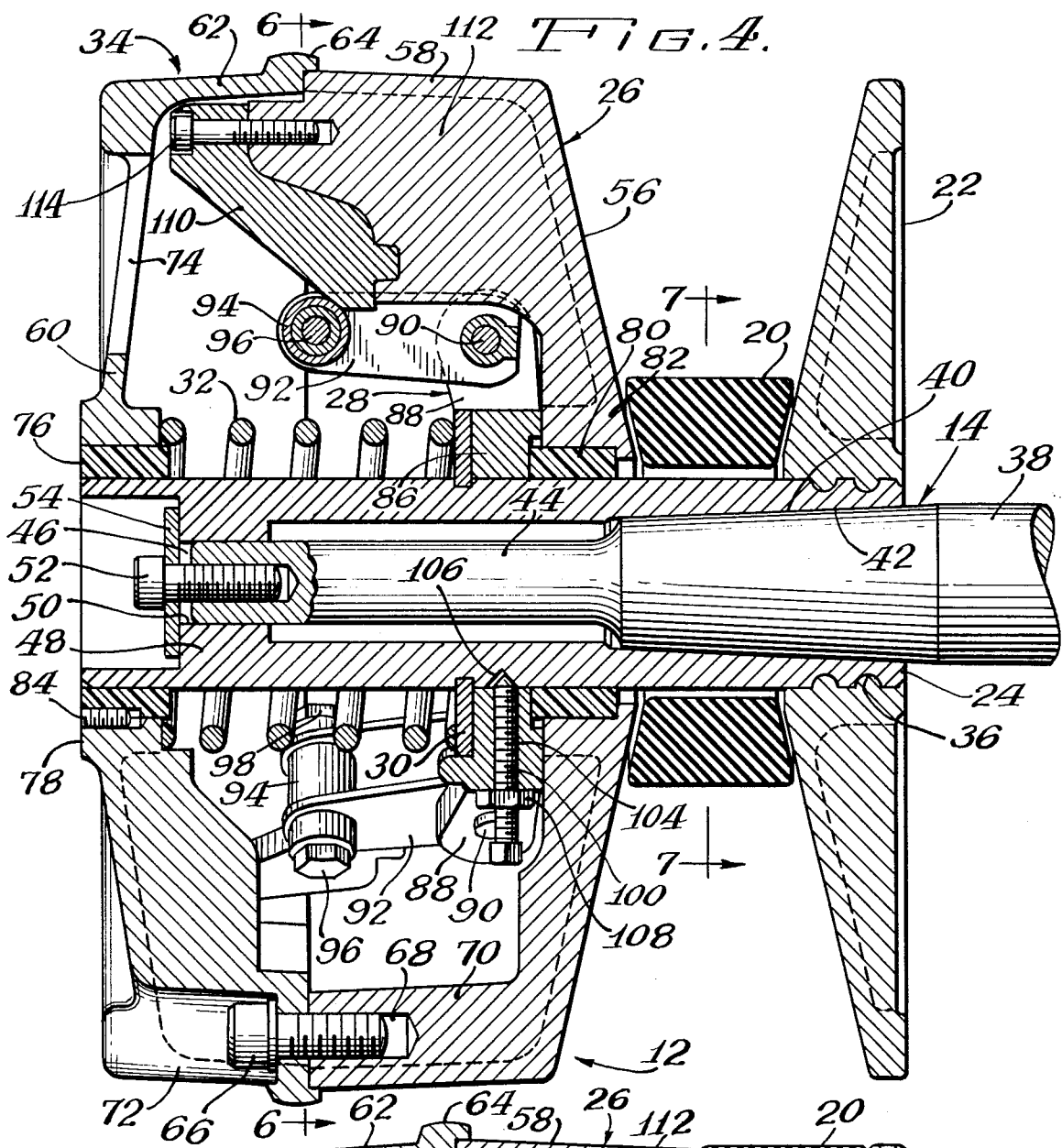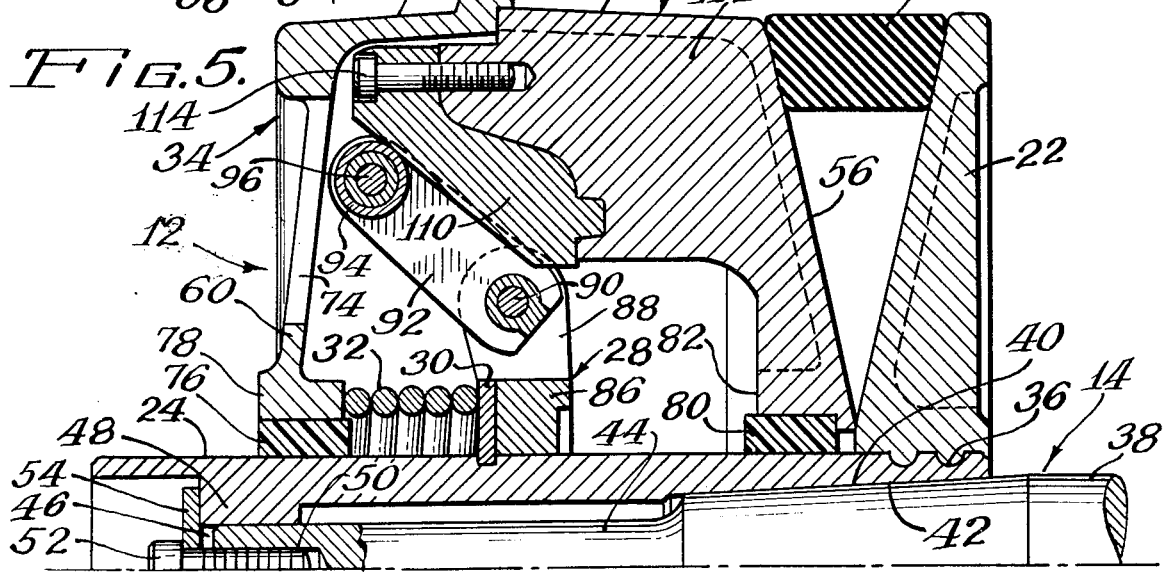

VARIABLE SPEED DRIVE CLUTCH

This is a continuation of application Ser. No. 457,482, filed Apr. 3, 1974 now abandoned.

FIELD OF THE INVENTION

This invention relates to improvements in centrifugal drive clutches and particularly to the driving connection between the drive shaft and the movable or axially slideable half of the drive sheave.

DISCUSSION OF THE PRIOR ART

Centrifugal drive clutch assemblies, which are the subject of this invention, generally include a drive shaft, a drive sheave mounted on the drive shaft, the drive sheave having a fixed half and a movable half, a drive shaft or output shaft, a driven sheave mounted on the output shaft, and a drive belt which drivably connects the drive sheave to the driven sheave. As the drive shaft, as from an internal combustion engine, rotates, the belt is moved radially in and out relative to both the drive shaft and driven shaft. Examples of variable speed, centrifugal drive assemblies of the type involved herein are shown, for example, in Domaas U.S. Pat. No. 3,733,918, Erickson et al. U.S. Pat. No. 3,727,478, Laughlin U.S. Pat. No. 3,605,510, Deschene U.S. Pat. No. 3,605,511, Larsson U.S. Pat. No. 3,393,572, Galleher U.S. Pat. No. 3,226,330, Thostenson U.S. Pat. No. 3,066,546, Van Der Brugghen et al. U.S. Pat. No. 3,017,783, and Math U.S. Pat. No. 2,944,434, Heyer U.S. Pat. No. 2,422,196.

Although the centrifugal, variable speed ratio, drive clutches of the type involved herein are used for a wide range of applications, particularly for various mechanisms operated by internal combustion engines, one important application of such variable speed drive clutches is in the operation of snowmobiles. Snowmobiles are not only widely used for conventional transportation, particularly in snow areas, but they are also used extensively for recreational purposes, often in wilderness areas. They are also widely used as emergency vehicles, in heavy snow areas. Particularly when the snowmobiles are used in wilderness areas and for emergency purposes, the equipment, particularly the entire drive assembly should be highly reliable and not susceptible to breakdowns. For example, it is important for the equipment to have highwear resistance, so that the equipment does not break down after an extended period of operation when the user is liable to be many miles from assistance. Furthermore, if a snowmobile does break down during use, it is highly desirable for the equipment to be readily and easily repaired by the user without assistance. This is particularly true with the drive assembly, including the variable speed drive clutch, which is commonly used in a snowmobile drive system.

In addition to reliability in operation, resistance to wear, and ease of repair, the design of a drive clutch for a snowmobile, as with practically any manufactured article, should be simple and economical, without sacrificing the important operational characteristics.

One common manner in which variable speed drive clutches for snowmobiles have been constructed is shown in U.S. Pat. No. 3,727,478. In such constructions, the spider carrying the flyweights is splined to the drive shaft, and the movable sheave housing is interconnected to the spider by a plurality of connecting pins which pass through three aligned openings in the two sheave halves and in the spider. Such a structure is considered undesirable because the spider and the pins become load bearing members and are susceptible to shear stress and fatigue, with resulting reliability problems in operation. Also, assembly of such parts is a problem because three openings in three separate parts must be in proper alignment for receiving the connecting pins.

SUMMARY OF THE INVENTION

In view of important design considerations and problems encountered with prior art mechanisms, it is an important object of this invention to provide an improved centrifugal, variable speed ratio, drive clutch assembly, particularly, useful in the drive assemblies of snowmobiles, wherein the clutch assembly is characterized by high fatigue resistance, reliability of use, ease of repair, and adaptability.

It is also an object of this invention to provide an improved centrifugal drive clutch assembly wherein the movable sheave section of the drive clutch is axially slidable on the drive shaft and is also rotated by more direct interconnection to the drive shaft than found in certain prior art arrangements.

It is a further object of this invention to provide an improved variable speed, centrifugal drive clutch wherein the slidable half of the drive sheave assembly is drivably interconnected to a non-circular drive shaft by bearings which are fixed, on their outer peripheries, to each of the sheave housings and the inner peripheries thereof have the same cross section as the shaft so as to be slideable thereon.

It is another object of this invention to provide an improved centrifugal, variable speed ratio, drive clutch assembly, wherein the assembly is further characterized by its simplicity and economy of construction and ease of maintenance.

It is yet another object of this invention to provide a variable speed drive clutch wherein the spider carrying the flyweights and the housing for the movable sheave half are drivably interconnected to the shaft and not to each other.

Additional objects of this invention will appear as the specification proceeds.

The foregoing objects are accomplished by providing, in a variable speed drive clutch having a drive belt interconnecting a drive sheave with a driven sheave, the combination of the drive shaft and a driven sheave having a first sheave section which is fixed on the drive shaft and a second sheave section which is operatively associated with the first sheave section, a housing being defined within the second sheave section, the second sheave section being axially slideable and non-rotatably mounted on the drive shaft, so that the drive shaft directly imparts rotary drive motion to the second sheave section; a flyweight support or spider is positioned within the housing and the support and the drive shaft include means for non-rotatably mounting the spider on the drive shaft for imparting direct rotary drive motion thereto, the spider acting solely as a support for the flyweights, no drive connection being provided between the two sheave sections and the spider, the spider being axially fixed on the drive shaft.

BRIEF DESCRIPTION OF THE DRAWINGS

On preferred embodiment of my invention is illustrated in the accompanying drawings wherein:

FIG. 1 is a side view of a centrifugal drive clutch assembly embodying my invention;

FIG. 2 is an end view of the drive clutch assembly shown in FIG. 1;

FIG. 3 is an expanded, pictorial view of the movable drive sheave shown in FIGS. 1 and 2;

FIG. 4 is an enlarged, cross-sectional view of the movable drive sheave illustrated in FIG. 3 while the drive sheave is in a stopped or low speed condition when the movable half of the sheave is spaced from the fixed sheave half;

FIG. 5 is a fragmentary view, similar to FIG. 4, illustrating the drive sheave at high speed conditions when the movable sheave half is adjacent the fixed sheave half;

DETAILED DESCRIPTION OF THE PREFERRED EMBODIMENT

Figure 6:
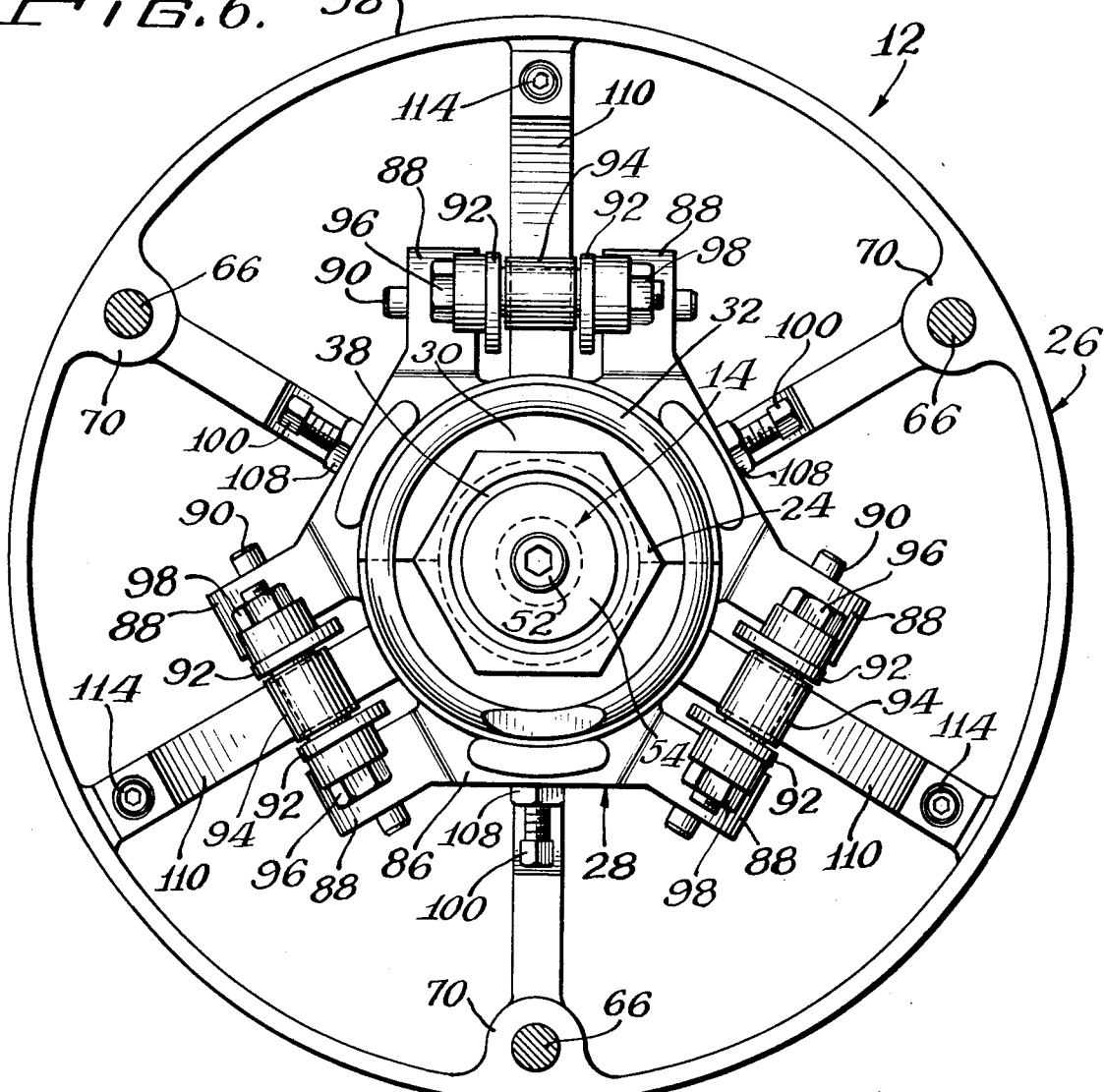
FIG. 6 is a transverse view taken along the line 6—6 of FIG. 4 illustrating a portion of the interior of the movable half of the driven sheave.

The variable speed ratio, centrifugal drive clutch assembly 10 embodying my invention includes a drive sheave 12 mounted on a drive shaft 14, driven shaft 16, a driven sheave or pulley, generally 18, which is mounted on the driven shaft 16, and a drive belt 20 which operatively and drivably interconnects the drive sheave 12 with the driven sheave 18.

Referring to FIG. 3, my new drive sheave 12 is shown in an exploded, pictorial view. The drive sheave 12 includes a fixed sheave half 22, a drive sleeve 24, a movable sheave half which includes a movable sheave housing assembly, generally 26, a spider assembly, generally 28, a split ring 30, a coil spring 32, and a housing cover assembly, generally 34.

Referring to FIGS. 3–5, the fixed sheave half 22 is secured to the drive sleeve 24 so as to be non-rotatable and non-axially movable thereon. Desirably, the fixed sheave half 22 is cast from aluminum directly onto the inner end of the drive sleeve 24. The drive sleeve 24 advantageously includes peripheral grooves 36 therein so that the cast metal of the fixed sheave half 22 flows therein to prevent axial movement of the fixed sheave half 22 on the drive sleeve 24. As will be described in greater detail, the drive sleeve 24 has a non-circular periphery, which is preferably hexagonal. Since the fixed sheave half 22 is cast thereon, the hub of the fixed sheave half 22 is non-rotatable on the hexagonal sleeve 24.

The outer peripheral shape of the drive sleeve 24, as described above, is non-circular, prefereably hexagonal, in cross-sectional shape. The drive sleeve 24 is fixed to a motor shaft 38 rotated by drive means (not shown) such as an internal combustion engine of the type used on a snowmobile. Although one important application of the drive clutch 10 is in snowmobiles, it is to be understood that the device is useful for a wide variety of purposes.

The drive sleeve 24 has a hollow interior which includes an inner peripheral frusto-conical portion 40 which receives, in mating relationship, the frusto-conical outer peripheral portion of a motor shaft 38. The motor shaft 38 includes an outer cylindrical portion 44 having an end which is received within an opening 46 in a transverse interior wall 48 of the drive sleeve 24. A threaded well 50 is provided in the outer end of the cylindrical portion 44 of the motor shaft 38. A bolt 52 is threadably received within the threaded well 50, with the head of the bolt 52 bearing against a lock washer 54 which, in turn, bears against the outer surface of the wall 48. The bolt 52 draws the drive sleeve 24 into firm, non-rotatable and non-axially movable relationship with the motor shaft 38, with the mating tapered portions 40 and 42 assuring substantially no relative rotation, by frictional resistance, between the drive sleeve 24 and motor shaft 38. The drive sleeve 24 and motor shaft 38 together define the drive shaft 14 for the drive sheave 12.

Referring to FIGS. 3 and 4, the movable sheave housing 26 includes an annular, tapered or frusto-conical sheave face 56 and a unitary outer peripheral wall 58. The sheave face 56 cooperates with the fixed sheave half 22 for drivably engaging the tapered edges of the drive belt 20 along the tapered surfaces of both the sheave face 56 and the cooperating sheave face of the fixed sheave half 22. Referring to FIG. 4, the housing cover assembly 34 includes an annular outer wall 60 and a unitary outer peripheral wall 62 which includes a peripheral lip 64 for receiving the outer edge of the peripheral wall 58 of the movable sheave housing 26. A plurality of bolts 66 rigidly secure the housing covering assembly 34 to the movable sheave housing 26. The bolts 66 are received within threaded apertures 68 provided on internal bosses 70 positioned along the inner periphery of the outer wall 58 of the sheave housing 26. The head ends of the bolts 66 are located within circumferentially spaced depressions 72 along the outer periphery of the outer peripheral wall 62 of the cover assembly 34. Desirably, a plurality of spaced inspection openings 74 are located in the outer wall 60 of the housing cover 34.

Referring particularly to FIGS. 3 and 4, the housing cover assembly 34 has a bearing 76 mounted along an inner hub 78 thereof. The sheave housing 26 includes a bearing 80 which is mounted along the inner periphery of an inner hub 82 of the sheave housing 26. The structural relationship and mounting of the bearings 76 and 80 on the cover housing 34 and on the sheave housing 26 constitute important features of the invention.

Both bearings 76 and 78 are constructed of a reinforced plastic; preferably the bearings are made of "Duralon". Duralon bearings comprise a Teflon fabric lined filament wound, reinforced plastic fiberglass backed bearing structure. The outer periphery of each of the bearings 76 and 78 is substantially cylindrical, and each of the bearings 76 and 78 is press fit in the respective hubs 78 and 82 of the cover housing assembly 34 and the movable sheave housing 26, respectively. It is important for the outer periphery of each of the bearings 76 and 80 to be non-rotatable relative to the housings 34 and 26, not only in order to avoid slippage of the housing 26 during operation of the clutch assembly 10, but it is also important for the spider assembly 28, to be hereinafter described, to be maintained in a predetermined orientation relative to the housings 26 and 34. In order to insure non-rotatability between the hub 78 and the bearing 76, a plurality of circumferentially spaced set screws 84, as seen best in FIG. 4, are threaded into threaded apertures defined in both the outer periphery of the bearing 76 and in the inner periphery of the hub 78. A plurality of set screws 84, as seen best in FIG. 3, are desirably used in order to assure against relative movement between the bearings 76 and 80 and the housings 26 and 34, when the clutch is in operation.

The inner periphery of each of the bearings 76 and 78 is the same cross sectional shape as the outer periphery of the drive sleeve 24, and like the sleeve 24, is preferably hexagonal in shape. The shape of the inner periphery of the bearings 76 and 80 and of the outer periphery of the drive sleeve 24 provides the desired axial sliding movement between the drive sleeve 24 and the bearings 76 and 80, while the hexagonal shape of the mating parts prevents a rotary movement therebetween.

Referring to FIGS. 3, 4, and 6, the spider assembly 28 includes a central hub 86 having an inner periphery with the same outer periphery as the drive sleeve 24, again, preferably hexagonal in shape.

Like the bearings 76 and 80, the spider assembly 86 is non-rotatable on the drive sleeve 24 because of the hexagonal shape of the cooperating drive sleeve 24 and of the inner periphery of the hub 86.

A plurality of spaced pairs of unitary support ears 88 project radially from the spider hub 86. Each pair of ears 88 has a pin 90 mounted therein. Each pin rotatably carries a pair of spaced links 92, which at their outer ends, carry flyweights 94 which have a low friction defined in the portion thereof positioned between the links 92. The flyweights 94 are secured to the links 92, as by a bolt 96 and a nut 98.

The spider assembly 28 is axially fixed on the drive sleeve 24 by the split ring 30 and by a plurality of cooperating locking set screws 100. The split ring 30 is received within a peripheral groove 102, as seen best in FIG. 3, in the drive sleeve 24. Each set screw 100, as seen best in FIG. 4, extends radially inwardly toward the drive sleeve 24 and is received within a threaded opening 104 in the spider hub 86. The inner end of each set screw 100 is pointed or conical in shape and is received within an oversized conical depression 106 having its axis offset inwardly relative to the axis of the end of the set screw. Since the depression 106 is oversized and offset relative to the end of the set screw 100, as the set screw is tightened and the pointed end passes into the depression 106, the tightening of each set screw 100 causes the spider assembly to move laterally outwardly against the split ring 30 in order to assure firm abutting relationship therebetween, thereby avoiding axial movement of the spider. Desirably, in order to assure that the set screws 100 remain in the desired position, a lock nut 108 is mounted on each set screw 100 and bears against the outer surface of the spider hub 86.

As conventional, the roller cam portions of the flyweights 94, as best seen in FIG. 6, are in engagement with outwardly tapered ramps or cams 110 which are rigidly secured to support portions 112 of the sheave housing 26 by means of a bolt 114, as seen in FIG. 4. Each bolt 114 passes through the ramp 110 and into the support portion 112 for rigid securement therebetween.

Figure 7:
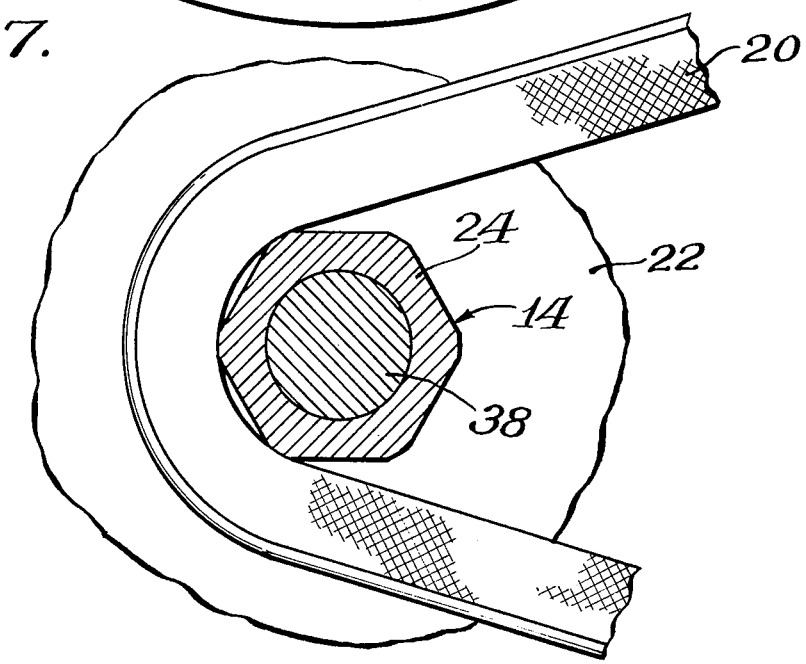
FIG. 7 is a sectional view taken along the line 7—7 of FIG. 4 showing the drive belt resting against the drive shaft during idling or stopped conditions.

The coil spring 32 is mounted around the drive sleeve 24 and is interposed between the split ring 30 and the hub 78 of the cover assembly 34 in order to normally bias the sheave face 56 of the sheave housing 26 away from the fixed sheave half 22, as seen in FIG. 4. Referring to FIGS. 4 and 7, when the clutch assembly 10 is in the rest position, the inner periphery of the drive belt rests against the hexagonal outer periphery of the drive sleeve 24 because the spring 32 urges the housing 26 from the fixed sheave half 22. It is preferred that, in the portion of the outer periphery of the drive sleeve 24, as seen in FIG. 7, contacting the inner periphery of the drive belt 20, the points or peaks of the hexagonal periphery are reduced, as by turning the sleeve 24 on a lathe, so as to provide a relatively smooth surface contacting the inner periphery of the drive belt. In this way, when the clutch sleeve 24 starts and stops rotating, there will be no sharp points on the hexagonal sleeve 24 to cut or tear the inner periphery of the drive belt 20 and thereby undesirably shorten the expected life of the belt 20.

Although the driven sheave 18 is of substantially conventional construction, a brief description will be provided herein in order to fully describe the clutch 10 and the improvements therein.

The driven sheave 18 is of substantially conventional construction and includes a fixed half 116 which is non-rotatable and non-slidable on the driven shaft 16. The driven sheave 18 also includes a movable sheave half 18 which is axially movable towards and away from the fixed half 116 on the driven shaft, in a conventional manner, but is non-rotatable thereon.

A fixed cam support 120 is rigidly secured to the outer end of the driven shaft 6. The cam support 120 has a cylindrical wall including a plurality of unitary ramp portions 122 which define a plurality of inwardly facing arcuate cam surfaces. The movable sheave half 118 includes a cylindrical, outwardly projecting wall 124 which terminates in a plurality of outwardly facing arcuate cam surfaces which mate in camming relationship with the inwardly facing cam surfaces on the ramp portions 122. A torsion compression spring 128 is mounted around the driven shaft 16 interior of the cylindrical wall 124 and cam support 120 in order to normally bias the movable sheave half 118 toward the fixed sheave half 116, as seen in the embodiment of FIG. 1.

In operation, referring to FIG. 4, when the clutch assembly 10 is in the rest condition, the housings 34 and 26 are spaced away from the fixed sheave half 22 so that the drive belt substantially rests against the outer periphery of the drive sleeve 24 as best seen in FIGS. 4 and 7. The spring 32 normally biases the housings 26 and 34 away from the fixed sheave half 22 in the manner shown.

As the motor shaft 38 and thereby the drive sleeve 24 begin to rotate, the hexagonal drive sleeve 24 rotates the bearings 76 and 80. Since the bearings 76 and 80 are non-rotatable relative to the housings 34 and 26, both housings 76 and 80 are rotated by the direct interconnection between the bearings and the drive sleeve. At the same time, the hexagonal interconnection between the spider assembly 28 and the drive sleeve 24 causes the spider 28 to rotate. As the speed of the drive shaft 14 increases, the flyweights 94 move outwardly by action of centrifugal force and the cam portions thereof bear against the cam surfaces of the ramps 110; so as to simultaneously move upwardly and outwardly on the ramps 110, thereby compressing the spring 32 as rotational speed increases. The greater the speed, the more the flyweights 94 move along the ramps 110 and the more the spring 32 is compressed.

Since the Duralon bearings 76 and 78 are non-rotatable but slidable along the hexagonal drive sleeve 24, both the housing 26 and the housing 34 move axially inwardly toward the fixed sheave half 22. The belt 20 is then forced away from the periphery of the drive sleeve 24 until reaching the maximum outer drive position shown in FIG. 5. As is conventional, as the drive belt 20 moves outwardly on the drive sheave 12, the drive belt 20 moves radially inwardly on the driven sheave 18 as the movable half 118 moves in a conventional manner, axially away from the fixed sheave half 116 thereof.

As the speed of the shaft 14 decreases, the opposite action occurs, that is, the flyweights 94 move back down the ramps 110 and the spring 32 moves the housings 26 and 34 away from the fixed sheave half 22, until the idling or stopped condition is attained with the drive belt once again contacting the outer periphery of the drive sleeve 24, as seen in FIG. 7.

From the foregoing, it is seen that we have provided a simply constructed and repaired variable drive clutch assembly. There is no driving torque applied to the spider assembly 28 as found in prior art devices. The spider 28 acts only as a carrier for the flyweights. The drive from the drive sleeve 24 is imparted directly to the moving half of the drive sheave 12 and to the spider 28 by the hexagonal shape of the drive sleeve. At the same time, the relative alignment which is required to be maintained between the flyweights 94, connected to the spider assembly 28, and the ramp portions 110 on the housing 26, is accomplished in a simple and convenient manner, as the structure assures that there is no rotation between the bearings 76 and 80 and the housings 26 and 34, and a positive relative alignment is also assured between the drive sleeve 24 and the spider assembly 28. Since the spider assembly 28 no longer undergoes undue wear, not only are the assembly problems required with prior art devices alleviated, but the life of the spider 28 is extended. The device can be easily repaired, even in the unlikely event of undue breakdown resulting from improper maintenance. Only conventional hand tools would normally be needed for repairs.

While a detailed description of one embodiment of the present invention is provided herein, it is to be understood that all equivalents obvious to those having skill in the applicable art are to be included within the scope of my invention, as claimed.

I claim:

1. For use with a variable speed drive clutch having a drive belt for operatively interconnecting a driven sheave with a drive sheave, a combination comprising a drive shaft, a drive sheave having a first sheave section fixedly mounted on said drive shaft and a second sheave section mounted on said drive shaft for movement towards and away from said first sheave section and being operatively associated with said first sheave section for receiving said drive belt therebetween, spaced bearing means fixedly secured to said second sheave section for axially movably mounting and non-rotably mounting said second sheave section on said drive shaft and for imparting direct rotary drive motion from said drive shaft to said second sheave section while permitting axial movement of said second sheave section on said drive shaft, said non-rotable mounting being the sole means for imparting said rotary drive motion to said second sheave section, said bearing means having an inner periphery, said drive shaft having an outer periphery, said inner periphery of each of said bearing means and said outer periphery of said drive shaft having substantially the same non-circular cross sectional shape, a flyweight support member mounted within said housing and between said bearing means, said support member having a central mounting portion with an inner periphery with substantially the same circular cross sectional shape as said inner periphery of said bearing means and said outer periphery of said drive shaft for non-rotably mounting said support member on said drive shaft, independently of said second sheave section, for imparting direct rotary drive motion to said support member, and means for axially fixing said support member on said drive shaft.

2. The mechanism of claim 1 wherein the inner periphery of said bearing means and the outer periphery of said drive shaft have the same hexagonal size and shape as said bearing means.

3. The mechanism of claim 2 wherein said shaft is hexagonal in shape from a position adjacent said first sheave section and extending for its entire length.

4. The mechanism of claim 2 where at least the portion of said drive shaft which may engage said drive belt has a more circular periphery on the portion of said drive shaft carrying said second sheave section so as to avoid undue wear of the inner periphery of said belt.

5. The mechanism of claim 1 wherein said axial fixing means for said flyweight support member includes a locking ring mounted on said shaft, and means for forcing said support member against said locking ring.

6. The mechanism of claim 5 wherein said forcing means includes a plurality of radial screw means passing through said support member, conical end portions on said screw means, conical depressions within said drive shaft for receiving said conical end portions of said screw means, said conical depressions being constructed and arranged to cooperate with said conical end portions to laterally slide said support member into abutting locking relationship with said locking ring.

7. The mechanism of claim 1 including means for maintaining a preselected alignment between said support member and said second sheave section, at all times, said maintaining means including said outer periphery of said drive shaft, said inner periphery of each of said bearing means, and said inner periphery of said support member.

* * * * *